Aug. 21, 1951  F. H. LAURILA  2,565,379
TIP-UP
Filed July 13, 1945
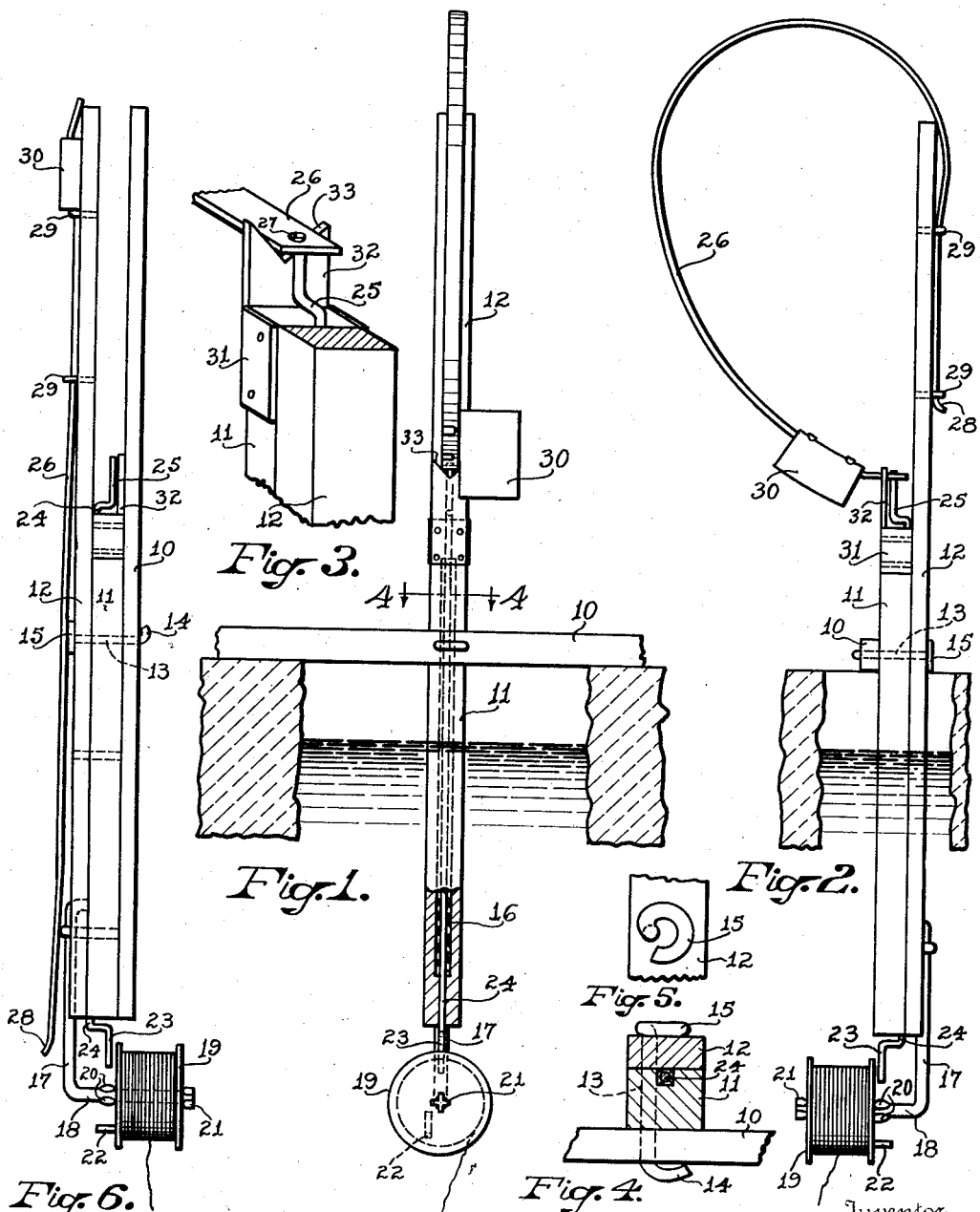
Inventor
Frans H. Laurila
By Chas. H. Richards
Attorney Patented Aug. 21, 1951

2,565,379

UNITED STATES PATENT OFFICE 2,565,379

TIPUP

Frans Hjalmar Laurila, Worcester, Mass., assignor to Never Fail Products Co., Inc., West Boylston, Mass., a corporation of Massachusetts Application July 13, 1945, Serial No. 604,876

1 Claim. (Cl. 43—17)

This invention relates to an improvement to a tip-up for use in fishing through the ice.

The principal object of the invention is to provide a novel construction in a signal or flag releasing means which is actuated by the operation of a reel below the surface of the water where it will not freeze.

Further objects will be apparent from the following detailed description in conjunction with the accompanying drawing, in which:

Fig. 1 is a front view of an embodiment of the invention with the signal or flag undisplayed.

Fig. 2 is a side view of the device shown in Fig. 1.

Fig. 3 is an enlarged view of the releasing mechanism.

Fig. 4 is a sectional view on the line 4—4 of Fig. 1.

Fig. 5 is a plan view of Fig. 4.

Fig. 6 is a side view of the tip-up folded up for transportation.

This device is an improvement on my previous device shown and described in Patent No. 2,122,841, issued to me July 5, 1938, and is used for fishing through the ice. The tip-up is arranged to carry a reel which will release the signal or flag when the fish bites and starts to run.

As described in the above patent, the tip-up comprises three bars 10, 11 and 12, with the bars 10 and 11 being secured together by any suitable means such as nails or screws to form a single unit. The bar 10 is fastened to the bars 11 and 12 by means of a spring tension device 13, having its end 14 bent to hold one end against bar 10 and the other end is provided with an integral coil 15 which gives a high degree of friction to hold the bars together so that while they can be turned on their pivot 13 to the position shown in Fig. 6, they will not turn due to slight forces when in the position shown in Fig. 1.

The bar 11 is provided with a passage 16 which is filled with non-solidifying grease which prevents water from entering the groove and constitutes a non-freezing feature in the device.

At the bottom of the bar 12 and extending downward is a member 17 having a horizontal portion 18 on which is rotatably mounted a fish line reel 19. The horizontal portion 18 is provided with lugs 20—20 which position the reel 19 while the reel is prevented from moving axially by lugs 21—21 formed on the end of the portion 18. The lugs 20 and 21 are integral with the horizontal portion 18 and are formed by squeezing the said portion 18 in the proper locations to correctly position the reel.

On one side of the reel 19 is a projection 22, formed from a portion of the reel flange, located some distance from the center of the reel. When the reel is turned the projection 22 contacts a crank shaped end 23 of a rod 24, extending upwardly through the grease filled passage 16, having a crank shaped end 25 at its upper end. It is for the purpose of having the rod 24 freely turnable at all times that the non-freezing feature of the grease filled passage 16 is provided.

A flat spring wire 26, slidably mounted on the bar 12, is provided with an eye 27, Fig. 3, and its lower end 28 bent out to prevent the wire from being accidentally passed through the guides 29—29. A flag 30 is suitably fastened to the spring wire 26.

A member 31, suitably fastened to the upper end of the bar 11, has a vertical portion 32 in which is formed a V-shaped portion 33, Fig. 3, for the purpose explained below.

In setting the tip-up for use, the bar 10 is rotated about its pivot 13 until it is at right angles to the bars 11 and 12. The spring wire 26 is moved up until the end 28 contacts the lower guide 29 and then it is distorted by being bent over, Figs. 1 and 2, and the end containing the eye 27 rests on the V-shaped portion 33 of member 31, Fig. 3, while the eye 27 is placed over the crank end 25 of the rod 24 so that the flag 30 is not on display. The reel is now lowered into the water through a hole in the ice and is held in position by the bar 10 which rests on the edges of the hole.

When a fish bites and starts to run, the reel will turn and the projection 22 will strike the crank end 23 of the rod 24 thereby turning the crank end 25 thus forcing the spring wire 26 up one side of the V 33 and moving the eye 27 off of the end 25 at which time the spring wire assumes a vertical position to display the flag so that it can be seen from a distance.

Having thus fully described my invention, what I claim new and desire to secure by Letters Patent, is:

As an article of manufacture, a tip-up comprising a support, an upright carried by the support, a rod rotatably mounted in said upright and having a crank on its upper and lower ends, a spring carrying a signal fastened to said upright and having means to receive the end of the upper crank, a member having a V-shaped portion fastened to the upright, and means to rotate the lower crank which rotates the upper crank and thereby move the spring upwardly along the V-shaped portion of said member to release the said spring from the upper crank.

FRANS HJALMAR LAURILA.

REFERENCES CITED

The following references are of record in the file of this patent:

UNITED STATES PATENTS

| Number | Name | Date |
|---|---|---|
| 1,803,914 | Oberg | May 5, 1931 |
| 2,114,529 | Goodhue | Apr. 19, 1938 |
| 2,122,841 | Laurila | July 5, 1938 |
| 2,165,833 | Bischof | July 11, 1939 |
| 2,416,481 | Hollenbeck | Feb. 25, 1947 |